United States Patent [19]

Wecker

[11] Patent Number: 4,518,557
[45] Date of Patent: May 21, 1985

[54] PROCESS FOR SKIN FOAM

[75] Inventor: Sheldon M. Wecker, Libertyville, Ill.

[73] Assignee: James River-Norwalk, Inc., So. Norwalk, Conn.

[21] Appl. No.: 264,574

[22] Filed: May 18, 1981

[51] Int. Cl.³ .............................................. B29D 27/00
[52] U.S. Cl. .................................. 264/45.9; 264/171; 425/115; 425/817 C
[58] Field of Search ........................ 264/45.9, 46.1, 51, 264/171; 425/115, 817 C

[56] References Cited

U.S. PATENT DOCUMENTS

| | | | |
|---|---|---|---|
| 3,311,681 | 3/1967 | Cherney et al. | 264/48 |
| 3,331,900 | 7/1967 | Thomas | 264/46.1 |
| 3,470,055 | 9/1969 | Wade | 156/244 |
| 3,557,265 | 1/1971 | Chisholm et al. | 264/46.1 |
| 3,645,837 | 2/1972 | Chisholm et al. | 264/46.1 X |
| 3,713,762 | 1/1973 | Oisugu | 425/197 |
| 3,760,046 | 9/1973 | Shwartz et al. | 264/46.1 |
| 3,843,285 | 10/1974 | Nitta et al. | 264/51 |
| 3,855,376 | 12/1974 | Ono et al. | 264/46.1 |
| 3,857,914 | 12/1974 | Aishima et al. | 264/46.1 X |
| 3,901,958 | 8/1975 | Doll | 264/46.1 X |
| 3,925,526 | 12/1975 | Haas | 264/45.5 |
| 3,956,438 | 5/1976 | Schippers | 264/46.1 |
| 3,972,664 | 8/1976 | Fillmann | 425/133.1 X |
| 4,034,131 | 7/1977 | Rhoads | 264/46.1 X |
| 4,038,446 | 7/1977 | Rhoads | 264/46.1 X |
| 4,054,403 | 10/1977 | Hornbeck et al. | 264/45.9 X |
| 4,067,949 | 1/1978 | Karabedian | 264/46.1 X |
| 4,071,597 | 1/1978 | Karabedian | 264/46.1 X |
| 4,093,414 | 6/1978 | Swiatovy, Jr. | 425/133.1 X |
| 4,206,165 | 6/1980 | Dukess | 264/45.9 |
| 4,221,624 | 9/1980 | Eslinger et al. | 264/45.9 X |

FOREIGN PATENT DOCUMENTS

| | | | |
|---|---|---|---|
| 2732866 | 1/1978 | Fed. Rep. of Germany | 264/45.9 |
| 55-4571 | 1/1980 | Japan | 264/45.9 |
| 954069 | 4/1964 | United Kingdom | 264/45.9 |

OTHER PUBLICATIONS

Perrigno, T. H. "Rigid Plastics Foams", New York, Reinhold, c 1963, pp. 148, 149.

Primary Examiner—Philip Anderson
Attorney, Agent, or Firm—William A. Aguele; Harry W. Hargis, III; Thomas H. Whaley

[57] ABSTRACT

In the manufacture of skinned foam a technique for matching the viscosity of the skin as well as the foam so that both flow uniformly through the die includes the addition of blowing agent to all of the layers of the structure. To prevent foaming of the skin layers, nucleating agent is not added at those layers and the temperature is controlled so as to prevent nucleation without a nucleating agent. More specifically, the skins are kept above the boiling point of the blowing agent at atmospheric pressure and melt temperature, but below the temperature at which homogeneous nucleation occurs.

11 Claims, 2 Drawing Figures

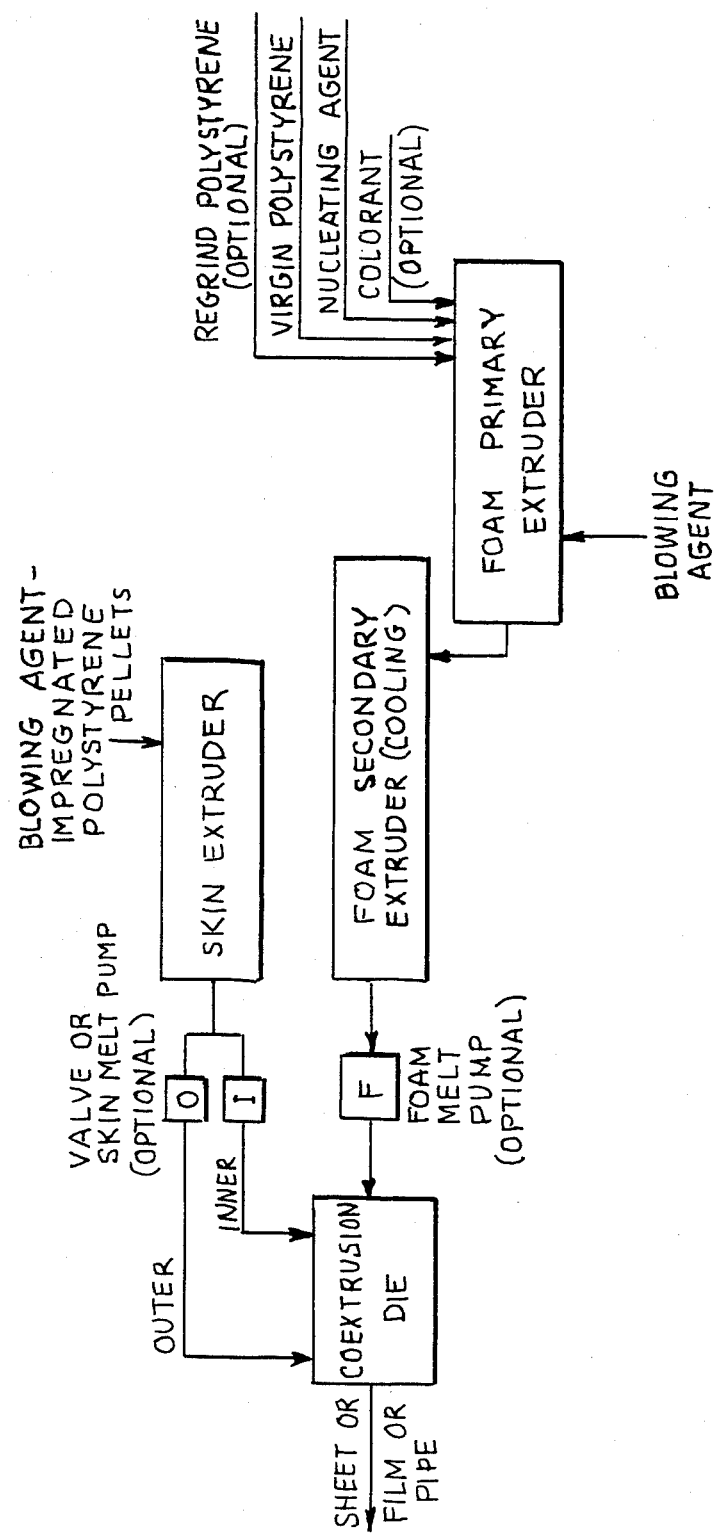

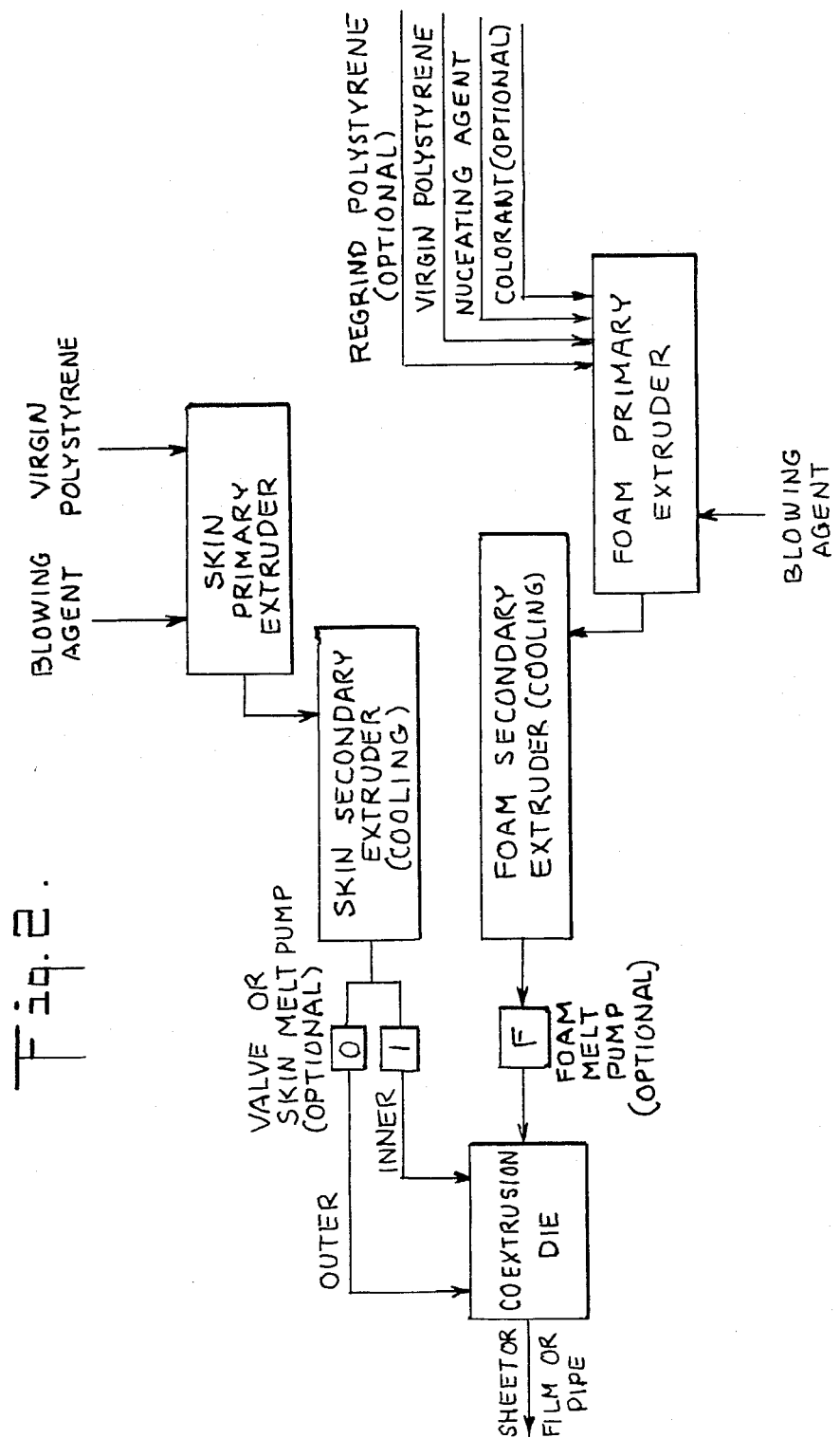

4,518,557

PROCESS FOR SKIN FOAM

BACKGROUND OF THE INVENTION

This invention relates to the forming of a substantially solid skin on the surface of a foam material. More particularly, it relates to the method by which the skin is developed during the formation of the foam. In the past, skin foam materials have been made for a number of reasons. A skin gives the foam a superior outer appearance in that the foam structure has a look of substance. Similarly, the skinned foam is resistant to surface abrasion and cutting when used, for example, as disposable mealservice. Skinned foam acts as a stiffened structure in the same way as an I-beam or a honeycomb sandwich when bent in that the surface skin is removed relative to the central plane of the structure, thus enabling a lighter and/or thinner overall structure having a maximum bending stiffness. Greater bending stiffness is achieved since the modulus of the foam tends to decrease more rapidly than the foam density, and the skin is carried on the surface or at the area where stress is maximum.

The prior patent art is full with techniques for forming skinned foam structures. The Haas U.S. Pat. No. 3,925,526 patent incorporates heat sinks in the mold in order to obtain areas of greater density on injection molded products. Selectively cooling different parts of the mold condenses and redissolves gasses in the foam to give a thicker skin on the injection molded parts. The feed for the injection molded parts is homogeneous and there is no stratification by the various temperatures of the mold components.

National Rubber Machine Corporation, of Talmadge, Ohio, has developed an extrusion process for skinned foam. Different melt streams are combined in a coextrusion die, one of which streams contains foaming agent. In order to assure non-mixing flow through the die so that the separate foaming and nonfoaming layers remain distinct, a low viscosity resin is used for the layers intended to be the foam skin. This is done to match the viscosity of the solid or skin layers to the foaming agent containing layers. This process has a number of disadvantages. Low viscosity resin tends to be more brittle and less heat resistant than the higher viscosity resin required for foaming. In addition, the scrap generated by such a process contains a mixture of low and high viscosity material. This scrap, which is typically between one-third and one-half of the extruded sheet in an extrusion-thermoforming operation, is difficult to use in the foam layer because the low viscosity fraction is difficult to foam, and is difficult to use in the solid or skin layer because the high molecular weight resin contamination raises the viscosity of this layer, where low viscosity is desired.

The Fillmann U.S. Pat. No. 3,972,664 shows thermoplastic multilayer bodies wherein the layers are of different densities. The injection molding process used includes different melt streams; one of which has a foaming agent and the other has no foaming agent. The streams are introduced to the mold sequentially thus the core and skin are produced independently. Such a system is slow and difficult to perform in that two steps must be sequentially executed and since the processing conditions for each step vary widely, readjustment time delays for setting the mold temperature may be necessary.

A melt flow separator in a coextrusion process for applying thermoplastic insulating compounds to a wire is shown in the Swiatovy, Jr., U.S. Pat. No. 4,093,414. Here different density polymers are extruded through a single die. The resulting surface on the foam is smooth but there is no control of the particular skin configuration i.e., the density or thickness of the skin relative to the foam. The Oisugu U.S. Pat. No. 3,713,762 has a breaker plate to divide the extruded plastic into two flows, one foaming and the other an unfoamed exterior cover layer. The separated flows are kept at different temperatures such that the skin does not foam. The Aishima et al U.S. Pat. No. 3,857,914 and Cherney U.S. Pat. No. 3,311,681 disclose other approaches to surface chilling for producing skin foam. The Nitta et al U.S. Pat. No. 3,843,285 shows rotational molding of resin powders that are centrifugally forced to a wall of the mold and which become skinned by introduction of steam on the rotated mold surface. Finally, Wade U.S. Pat. No. 3,470,055 shows an extrusion coating process for providing a polymer surface laminated to a subsurface by cooling under a chilled roll.

The prior art techniques disclose processes that are limited since they may not have the advantages and economics of a single die that permit good control of the difference in strength, density and thickness of the skin relative to the foam core or require use of materials which introduce problems in subsequent processing steps. Similarly, techniques using multiple dies or lamination of materials to produce the difference in density, strength, material and/or thickness for the core relative to the surface are complicated and uneconomical.

OBJECTS OF THE DISCLOSURE

It is, therefore, an object of the present invention to provide a means by which a simple, low cost and reliable technique can be used to produce a skinned foam wherein the density and thickness of the skin relative to the foam core can be easily adjusted.

It is yet another object of the invention to disclose equipment, techniques and materials which permit the molding by thermoforming of multilayer extrusions and molding of plastic with hard outer skin and foam core.

It is still a further object of the invention to add lubricant or plasticizer to the melt flow for the outer layer to an extent sufficient to match the viscosity of the outer layer to the viscosity of the center layer so that flow of both layers will be stable and easily controllable.

It is a further object of the invention to prevent foaming of the skin layers by not adding nucleating agent and by regulating the temperature to prevent spontaneous nucleation.

It is still a further object of the invention to regulate the temperature in the skin layers so that the plasticizer is above the boiling point at atmospheric pressure and below the homogeneous nucleation temperature.

It is an additional object of this invention to provide a means by which thick outer skins can be more easily made than is possible by surface chilling means, without the disadvantage of increased foam core density resulting from the restricting effect of the viscous chilled skins on foam layers during foam growth.

It is an additional object of this invention to provide a means by which thicker outer skins can be made than is possible by surface chilling means.

SUMMARY OF THE DISCLOSURE

Processes for manufacturing plastic foam materials generally use either chemical blowing agents or physical blowing agents to generate the gas necessary to form the foam void phase. Chemical blowing agents generate gas by undergoing chemical reactions which produce gas as a by-product. An example is the decomposition of azodicarbonamide with heat to generate nitrogen. Typically, chemical blowing agent processes are capable of reducing resin density by one-half when used in conjunction with typical extrusion or molding processes. Physical blowing agents such as the hydrocarbons butane and pentane, and the chlorofluorocarbon (CFC) dichlorodifluoromethane (CFC-12) function by undergoing a phase change, from the liquid phase to the gas phase, during the foaming process. Density can be reduced by a factor of twenty or more by the use of physical blowing agents. The problems commonly encountered in producing multilayer articles by co-injection or co-extrusion techniques when using physical blowing agents are much more severe than those experienced commonly with chemical blowing agents. This disclosure deals with multilayer structures produced using physical blowing agents, though the principles may be applicable to chemical blowing agent processes as well.

In a common foam extrusion process plastic pellets are mixed with a nucleating agent and then melted in a heated extruder where the plastic and nucleating agent are held under high temperature and pressure. To the pressurized melt is added the physical blowing agent such as a liquid which will vaporize at die melt temperatures and atmospheric pressure. The blowing agent tends to act as a plasticizer reducing the viscosity and lowering the level of temperature necessary to maintain the hot melt condition of the mixture of plastic and nucleating agent. The blowing agent is mixed with the melted plastic and nucleating agent and the combination is cooled to an extrusion temperature suitable for foaming. The cooled combination is extruded through a co-extrusion die and when released to atmospheric pressure the liquid blowing agent vaporizes and expands forming bubbles of gas at the nucleating sites established by the uniformly dispersed nucleating agent. One particular system uses polystyrene as the plastic, pentane as the blowing agent and a citric acid, sodium bicarbonate mixture as the nucleating agent.

Production of skinned foam articles using common injection molding or extrusion techniques is complicated by viscosity mismatch problems when using physical blowing agents.

More particularly, the process temperature and the viscosity level of the molten resin layers must be in accord with one another during passage through relatively thin channels in the die. The usual methods for extrusion or injection of nonfoaming surface layers (free of blowing agent) presents problems since the foaming core includes blowing agent. The flow characteristics of the melt streams with and without blowing agents are different. The viscosity mismatch between similar materials with or without blowing agents results in flow instabilities and mixing in the mold, die or other flow channels.

In addition, the temperatures required to process skin and foam material are generally different. One means for overcoming this problem is the use of different process temperatures for the skin and core materials. Such temperature control is complicated and the required temperature gradients are difficult to assure.

Polystyrene melt charged with a blowing agent such as pentane can be heated to a critical temperature which is greater than the normal boiling point of pentane before foam formation occurs if nucleating agent is absent. More specifically, material containing blowing agents but no nucleating agent can be extruded without foam formation at temperatures above the boiling point of the blowing agent at atmospheric pressure but below an experimentally and theoretically determined maximum temperature. By addition of blowing agent to the melt stream for the outer nonfoaming layer, the viscosity of the center or foam layer can be substantially matched and stable flow of the layers will exist. Stable flow prevents mixing between the layers. Omission of the nucleating agent from the outer, or nonfoaming layers allows the temperature of these layers to be above the vaporization point of the blowing agent without the occurrence of foam formation. More particularly, such heterogeneous nucleation sites promote foaming in the outer or skin layer when present. Moreover, the viscosity reduction resulting from blowing agent addition can be used to facilitate the filling of thin sections in, for example, an injection molding operation.

It should be appreciated that the success of this process depends on maintaining the blowing agent contained in the skin layers in a metastable state for a time sufficient to carry out any necessary processing steps subsequent to release from high pressure. For the ideal case, where no blowing agent is present and no polymer interactions occur and the system is totally free from contaminants, such as dust, or mechanical shocks which may induce nucleation, the upper temperature limit to the desired metastable state is given by the critical temperature for homogeneous nucleation, a theoretically derivable quantity. However, even when special pains are taken to ensure ideal conditions in laboratory experiments, some blowing agents cannot be superheated to this critical temperature. It is obvious that in manufacturing operations, conditions will not be ideal. In practice, the range of temperatures, blowing agent levels, and times to which this process has application is best determined on a case by case basis, by changing the appropriate variables and observing whether bubbles are present in the skin layer.

BRIEF DESCRIPTION OF THE DRAWINGS

FIG. 1 is a schematic flow diagram illustrating a preferred embodiment of the process of this invention.

FIG. 2 is a schematic flow diagram illustrating another embodiment of the process of this invention.

DETAILED DESCRIPTION OF THE DISCLOSURE

This disclosure relates to the production of polymeric items having at least two distinct layers from a hot pressurized melt. A multiple density structure will be generated if, on release of pressure, at least one layer is caused to foam and substantially the other layers e.g., skin layers, do not. Pressure release may be accomplished by extrusion through an orifice and release to the atmosphere, or by opening a confining mold. The layers are distinct in that the foam material has a cellular makeup. That is to say that, the foam material has a lower density than the unfoamed material, the interior of the cells are devoid of polymeric material and the cells are uniformly dispersed throughout the foam layer. The present disclosure teaches a technique for generating a multidensity polymeric structure by means of placement of nucleating agent and control of the processing temperature. More specifically, a volatile organic blowing agent is added to the portion which is not intended to foam for the purpose of reducing its viscosity to the point where the flow of the separate layers remain stable and process temperatures required for the different layers are compatible. The nonfoamed polymer material must also be maintained at the time of pressure release below the temperature at which homogeneous nucleation of the blowing agent will occur such that once pressure is released it will not spontaneously foam. Notwithstanding the criticality of the temperature control and the viscosity matching, a wide range of temperatures and viscosities are suitable for multidensity structures.

The process conditions and materials will depend upon the density sought in the ultimate construction. By the very nature of the varying densities of a multilayer structure, it should be appreciated that the nonfoamed component will generally be thinner in cross-sectional depth than the foamed component. Typically, such constructions have a thinner nonfoamed skin layer and a thicker foamed core layer. Thus, any reference to skin is as common terminology for an unfoamed portion of a multilayer construction and usually positioned on the exterior thereof. It should also be appreciated that this process can be used to produce multilayer structures in which all layers are foam with the foam density varying between layers. This can be done by maintaining the blowing agent in the different layers at levels required for stable flow and/or varying the nucleating agent level in the different layers.

FIG. 1 and FIG. 2 are illustrative of the procedures employed in the examples which follow.

The examples were generated through a coextrusion die attached to an experimental apparatus which consists of a 2½" diameter extruder having a 32 to 1 screw length to diameter ratio operating in series with a 3½" diameter extruder having a 30 to 1 screw length to diameter ratio. Both extruders were manufactured by Gloucester Engineering Corp., Gloucester, Mass. Such a system is commonly known as a tandem line in the foam extrusion industry. Raw materials are fed to a volumetric feeding and mixing device. (Whitlock, Inc., Farmington Hills, Mich.) where resin and nucleating agent for the foam layer are blended together in the desired ratio. Resin drops from the blender into the hopper of the 2½" extruder, where it is melted. The screw is a single stage design. Screw speed can be controlled between 0 and 154 RPM, and was typically set at 95 RPM for these experiments. Five separate zones with both heating and cooling capabilities determine barrel temperature. As ascending temperature profile was used, starting at point 370° F. at the hopper and increasing to about 410° F. at the discharge. Blowing agent is added from the 2½ extruder to the extruder through a drilled port eight diameters prior to discharge by a positive displacement diaphragm pump (not illustrated) (LEWA HLM-2 with 10 mm heads). Blowing agent flow rate was maintained constant by a variable resistance valve and flow control system (not illustrated) (Foxboro Company, Foxboro, Mass.). Pumps were typically operated at 4,500 psi and injection pressure was in the range of 2,000 to 3,500 psi, depending on extrusion conditions, temperature and formulation. After injection into the extruder, the blowing agent is incorporated into the melt in a five diameter mixing section, followed by a 2.85 diameter metering section. Melt temperature at discharge was typically 420° F. and melt pressure ranged from 2,000 psi to 3,500 psi depending on formulation and throughput rate. Melt is transferred from the 2½ extruder to the 3½" extruder under pressure, through a ¾" diameter pipe. Pressure at the entry of the 3½" extruder was typically 2,000 psi. Screw speed can be varied between 0 and 76 RPM, and was typically set at 34 RPM for these experiments. A special low shear mixing screw (not illustrated) is used in conjunction with five separate cooling zones on the extruder barrel to reduce melt temperature to levels required for foam extrusion, generally between 250° F. and 300° F. Barrel zones can also be heated for startup purposes. Melt temperature at discharge was typically 275° F. and melt pressure ranged between 2,000 and 3,000 psi depending on formulation, throughput rate and die gap. This melt was fed to the center layer of a three layer manifold type annular co-extrusion die mounted on the end of the 3½" extruder by means of a foam melt pump. The co-extrusion die was equipped with separate entry ports for the inside and the outside layers. Optionally, melt could be fed to either one port individually or both simultaneously permitting two or three layer structures. Melt for the inside and outside layers was provided by a 2½" extruder (Egan Machinery Co., Sommerville, N.J.) having a 24 to 1 screw length to diameter ratio. Best results were obtained using a single stage screw designed for polystyrene, although a two stage screw was used for some experiments. Two types of resins were processed in this extruder, polystyrene and polystyrene charged with pentane blowing agent. Melt temperature and pressure ranged between 300° and 325° F., and 2,500 and 4,000 psi for the pentane charged material, and was typically 420° F. and 4,500 psi for the polystyrene without pentane. The melt was fed to the co-extrusion die by means of skin melt pumps, one for each of the outer and inner skin layers.

FIG. 2 also shows the use of an additional skin extruder provided with means (not illustrated) for heating the skin material. In this case the 2½" secondary extruder for the skin is provided with means (not illustrated) for cooling the skin melt.

While such an apparatus was used for generating the results of all the examples but one, the present disclosure covers the concept in connection with injection molding as well.

EXAMPLE 1

Melt consisting of polystyrene (Monsanto-HH103), ½% talc nucleating agent and 6% dichlorodifluoromethane was produced in a Gloucester Engineering Corporation 2½ inch 3½ inch tandem foam extrusion line and fed at 288° F. and 155 lbs/hr to the inside layer of a 3 inch diameter, annular co-extrusion die. Simultaneously, polystyrene containing approximately 5% pentane (BASF-Styropor) was melted in an Egan 2½ inch extruder and fed at 325° F. and 45 lbs/hr to the outside layer of the annular co-extrusion die. Die metal temperature was controlled at 280° F. Simultaneous with the exit of the melt from the die, room temperature compressed air was blown at the outside surface of the annulus through a conventional air-ring. The extrudate was drawn over a 12¼ inch diameter sizing mandrel, slit open, and wound into a roll. The resulting sheet consisted of a substantially solid skin layer, 2 mils thick, on top of a 9 pound per cubic foot (PCF) density foam layer 90 mils thick. Mealservice dishes were subsequently thermoformed from this sheet.

EXAMPLE 2

Melt for the foam layer was produced in the Gloucester tandem foam extrusion system of Example 1. Melt for the skin layers was produced in the Egan extruder of Example 1. The materials were combined in an annular die arranged to feed material to an inside and an outside layer. The foam melt was fed to a core layer separating the two skin layers.

The compositions of the two materials were as follows:

| Skin Layers | | Foam Layer | |
|---|---|---|---|
| BASF Styropor | 100% | Monsanto Lustrex HH103 | 92% |
| | | Pentane | 7.56% |
| | | Citric Acid | 0.19% |
| | | Sodium Bicarbonate | 0.25% |

Styropor is polystyrene containing approximately 5% pentane. Lustrex HH103 is a high molecular weight polystyrene.

The extrusion conditions were as follows:

| | Foam Layers | Skin Layers |
|---|---|---|
| Melt temp. entering Die | 273° F. | 307° F. |
| Melt pressure entering Die | 1950 psi | 2500 psi |
| Throughput | 155 lbs/hr | 150 lbs/hr |
| Die Metal temperature | 265–270° F. | 265–270° F. |
| RPM of Gloucester Primary Extruder | 95 | |
| RPM of Egan Extruder | — | 91 |
| RPM of Gloucester Secondary Extruder | 34 | — |

The skin resin was fed into both skin layer die entry ports to produce a three layer (skin—foam—skin) construction. The extrudate was drawn over a 12¼" diameter sizing mandrel, slit open and wound into a roll at 56' per minute. The resulting sheet consists of three distinct layers. The skin layers were substantially continuous and free of bubbles. The total thickness of the sheet after cooling was 43 mils comprising two 1 mil skins and 41 mils of 8.5 PCF density foam. Mealservice was thermoformed from this sheet.

EXAMPLE 3

Melts for the foam and skin layers were produced in the extrusion systems of Examples 1 and 2. The materials were combined in an annular co-extrusion die to produce a foam core layer separating two skin layers.

The compositions of the two materials were as follows:

| Skin Layers | | Foam Layers | |
|---|---|---|---|
| BASF Styropor | 100% | Monsanto Lustrex HH103 | 94.6% |
| | | Pentane | 4.9% |
| | | Citric Acid | 0.18% |
| | | Sodium Bicarbonate | 0.24% |

The extrusion conditions were as follows:

| Skin Layers | Foam Layers | |
|---|---|---|
| Melt temp. entering die | 305° F. | 277° F. |

-continued

| Skin Layers | Foam Layers | |
|---|---|---|
| Melt pressure entering die | 2900 psi | 1800 psi |
| Throughput | 130 lb/hr | 155 lb/hr |
| RPM Gloucester Primary Extruder | | 95.1 |
| RPM of Egan Extruder | 83 | |
| RPM of Gloucester Secondary Extruder | | 33.3 |

The skin and the foam materials were fed into the die and the extrudate was drawn over the cooling mandrel and slit open in the same manner as in Example 2. The sheet was wound at 70'/min. The resulting sheet comprised three distinct layers with the skin layers continuous and free of bubbles. Total thickness was 18 mils, the skin thickness was 1 mil for each side. This three layer skinned sheet was produced with and without the use of the annular air-ring of Example 1. No substantial difference in the thickness or bubble free nature of the skin was noted.

EXAMPLE 4

An attempt was made to produce 3 layer skin foam from the following formulation:

| Skin Layer | | Foam Layers | |
|---|---|---|---|
| Monsanto Lustrex HH103 | 100% | Monsanto Lustrex HH103 | 92% |
| | | Pentane | 7.56% |
| | | Citric Acid | .19% |
| | | Sodium Bicarbonate | .25% |

The melts were produced using the Gloucester foam extruders and the Egan skin extruder of Example 1. The skin layer material and the foam layer material were fed in the same co-extrusion die set up to produce a skin—foam—skin construction as in Example 2.

The extrusion conditions were as follows:

| | Foam Layers | Skin Layers |
|---|---|---|
| Melt temp (entering die) | 270–316° F. | 400–420° F. |
| Melt pressure entering die | 1900 psi | 5000–4000 psi |
| Die metal | 270–330 | 270–330 |
| RPM, Gloucester Primary Extruder | 95 | |
| RPM Gloucester Secondary Extruder | 34 | |
| RPM Egan Extruder | | 30–91 |
| Throughput | 155 lb/hr | 50–150 lb/hr |

Melt temperatures were varied in both the foam layer and the skin layer materials by adjusting extrusion conditions. No combination of conditions was found which made it possible to produce a tube of extrudate stable enough to draw over a sizing mandrel. When the skin layer material was hot enough to match viscosity with the foam layer material it heated the foam to the point where it did not foam properly. The skin layer material temperature and the ratio of skin material to foam material were both reduced in an attempt to eliminate overheating of the foam. The viscosity of the skin layer became too high for uniform formation of layers before the required temperature for foam formation was reached.

EXAMPLE 5

The same principles can be applied to injection molding and blow molding as well as extrusion.

Polystyrene pellets containing approximately 5% pentane (BASF-Styropor) were added to the hoppers of three different reciprocating screw plasticators. The melt streams from these plasticators were combined to produce a three layer parison which was subsequently blow molded can shaped container. The machine was started at high melt and injection mold temperature, resulting in cans containing bubbles in all layers. Both melt and injection mold temperatures were lowered until bubble free containers were produced. At this point, a styrene-maleic anhydride copolymer nucleating agent (ARCO-SMA-2000) was added to resin in the hopper of the plasticator providing melt to the middle layer. The resulting container consisted of two solid outside skins, approximately 10 mils thick, encapsulating an 8 PCF, 95 mil thick foam core.

It should be appreciated that the foregoing concept can be applied in connection with other means in order to have a combined and enhanced result. More particularly, air-ring chilling can be used in combination with viscosity matching to simplify and/or enhance the ease with which a preferred skin foam structure is achieved. It should also be appreciated that it is not necessary for the blowing agent added to the skin layers to be identical to that added to layers where foaming is desired.

What is claimed is:

1. In a method of making a foamed plastic product having a relatively low density cellular core structure and a substantially non-cellular outer layer or skin wherein a first or foam stream of foamable normally solid molten polymer containing blowing agent is fed to a co-extrusion die under pressure and expanded on exiting from said die to form said cellular core and a second or skin stream of said normally solid molten polymer is supplied to said co-extrusion die to form said skin, the improvement which comprises:

incorporating a volatile organic blowing agent and a nucleating agent in said first or foam stream of polymer, incorporating a volatile organic blowing agent in said second or skin stream of polymer in an amount effective to match the viscosity of said second stream to that of said first stream and maintain stable flow of said second stream relative to said first stream, supplying said second stream to said co-extrusion die at a temperature sufficient to produce foam formation on expansion of the polymer leaving the die, and supplying said second stream to said co-extrusion die at a temperature lower than that required to producing foaming in said second stream of polymer on release of pressure in said co-extrusion die.

2. The method of claim 1 wherein said volatile organic blowing agent is a chlorofluorocarbon.

3. A method of making a foamed plastic product having a non-cellular outer surface or skin of relatively high density and a foamed core having a relatively low density cellular structure comprising:

feeding a first or foam stream of a foamable normally solid molten polymer containing a blowing agent and a nucleating agent under pressure to one outlet of a co-extrusion die where it is expanded to substantially atmospheric pressure with foaming a formation of said inner core structure;

feeding a second or skin stream of a foamable normally solid molten polymer containing a volatile organic liquid blowing agent in an amount effective to match the viscosity of said second stream to that of said first stream and maintain stable flow of said second stream relative to said first stream and free from any added nucleating agent to said co-extrusion die under pressure wherein it is extruded with said first stream of polymer;

supplying said first or foam stream to said co-extrusion die at a temperature sufficient to cause foaming of said polymer on release of pressure; and supplying said second or skin stream to said co-extrusion die at a temperature below that at which foaming of said polymer occurs spontaneously on release of pressure thereby forming a skin on said foamed core.

4. A method according to claim 3 wherein said second stream is supplied to said co-extrusion die at points adjacent each side of said first stream forming a foamed sheet with a skin surface on each side of said core.

5. A process according to claim 3 wherein the polymer in each stream comprises a styrene resin and the blowing agent in each comprises a chlorofluorocarbon.

6. The method of claim 1 wherein said polymer is a styrene resin.

7. The method of claim 1 wherein said volatile organic blowing agent is n-pentane.

8. The method of claim 2 wherein said blowing agent is dichlorodifluoromethane.

9. The method of claim 1 wherein said nucleating agent is a mixture of citric acid and sodium bicarbonate.

10. The method of claim 1 wherein said nucleating agent is SMA, a co-polymer of styrene and maleic anhydride.

11. The method of claim 1 wherein said nucleating agent is talc.

* * * * *

UNITED STATES PATENT AND TRADEMARK OFFICE
CERTIFICATE OF CORRECTION

PATENT NO. : 4,518,557
DATED : May 21, 1985
INVENTOR(S) : S. M. Wecker

It is certified that error appears in the above-identified patent and that said Letters Patent is hereby corrected as shown below:

Col. 5, line 55, "As" should read: -- An --.

The sentence beginning at line 57 should read: "Blowing agent is added to the 2-1/2 extruder through a drilled port eight diameters prior to discharge by a positive displacement diaphragm pump, not illustrated (LEWA HIM-2 with 10 mm heads)."

Signed and Sealed this

Thirteenth Day of August 1985

[SEAL]

Attest:

DONALD J. QUIGG

Attesting Officer

Acting Commissioner of Patents and Trademarks